United States Patent [19]

Foukes et al.

[11] Patent Number: 5,919,845
[45] Date of Patent: Jul. 6, 1999

[54] LEVELLING AGENTS FOR POWDER COATINGS

[75] Inventors: Richard Foukes, Oakville, Canada; Klaus Cibura; Rolf Boysen, both of Münster, Germany; Josef Rademacher, Beverly Hills, Mich.

[73] Assignee: BASF Coatings AG, Muenster-Hiltrup, Germany

[21] Appl. No.: 09/066,488

[22] PCT Filed: Oct. 28, 1996

[86] PCT No.: PCT/EP96/04684

§ 371 Date: May 27, 1998

§ 102(e) Date: May 27, 1998

[87] PCT Pub. No.: WO97/16494

PCT Pub. Date: May 9, 1997

[30] Foreign Application Priority Data

Oct. 28, 1995 [DE] Germany .......................... 195 40 313

[51] Int. Cl.$^6$ ................ C09D 5/46; C09D 5/03; C09D 7/06
[52] U.S. Cl. .............. 524/31; 525/185; 525/187; 525/191; 525/200; 525/203; 525/213; 525/227; 525/231; 525/241; 525/330.7
[58] Field of Search ................ 524/31; 525/185, 525/187, 191, 200, 203, 213, 227, 231, 241, 330.7

[56] References Cited

U.S. PATENT DOCUMENTS 5,187,201  2/1993  Haubennestel et al. .

*Primary Examiner*—Nathan M. Nutter

[57] ABSTRACT

The present invention relates to a powder coating having improved surface properties which contains from 0.05 to 5% by weight, preferably 0.5 to 1.5% by weight, of aliphatic polyvinyl ethers.

14 Claims, No Drawings

LEVELLING AGENTS FOR POWDER COATINGS

This application is a Continuation filed Apr. 23, 1998 under 35 USC 371 of PCT/EP96/04684.

BACKGROUND OF THE INVENTION

The invention relates to a powder coating which has improved surface properties through the use of a levelling agent.

For some years, powder coatings have been finding an ever greater field of application. Powder coatings are in the form of a dry powder which, generally with the aid of electrostatic charging, is applied in finely divided form to the surface of the article to be coated and is then dried, i.e. stoved. In the course of stoving, which is usually effected at temperatures between 130 and 220° C., crosslinking reactions and film formation give rise to the solid coating on the workpiece. Powder coatings of this kind offer a range of advantages. For instance, the pulverulent consistency of the coating material does away with the need to operate with solvents. Accordingly, powder coatings are unhampered by all of those environmental problems commonly associated with the evaporation of the solvents. Moreover, the heat energy otherwise necessary to evaporate the solvents is spared. A further advantage of powder coatings is that material which has not adhered permanently to the workpiece can be collected at the bottom of the powder booth and used again without problems. In this way it is possible to achieve a degree of powder utilization of up to 98%. This increased degree of utilization brings not only cost advantages but also a much lower level of environmental pollution than is the case with conventional coating materials.

Powder coatings are prepared from binders, hardeners, fillers, pigments and additives. In terms of the binders and hardeners used, modern-day powder coatings are generally based on one of the following polymer classes: epoxides; epoxy/polyester mixtures; polyesters; polyesters/isocyanates (polyurethanes); acrylates.

One problem associated with the use of powder coatings, however, is that of obtaining a surface having sufficiently good properties. Thus, in general, considerable defects appear in the stoved powder coating film which reduce the surface smoothness. One of the causes of these surface defects is the fact that the powder of the coating material, applied in a nonuniform manner and with its own structure, does not have sufficient time in the course of stoving to flow out during its liquid phase (with a minimal viscosity level) and in doing so to form a uniform covering of the surface of the workpiece. This is because melting and the attainment of minimum viscosity are accompanied simultaneously by the beginning of crosslinking of the binders and therefore of polymerization of the coating material. A further important cause of irregular film surfaces are impurities in the powder coating material.

To improve the surface smoothness of powder coating films, additives have long been employed. For such purposes use is preferably made of acrylate heteropolymers and homopolymers in the molecular weight range of Mw=5000 to 200,000. Typical examples of such polymers are Acronal 4 F® and Byk-360 P® (Acronal 4 F® is a trade mark of BASF AG; Byk-360 P® is a trade mark of the company Byk-Chemie).

Acronal 4 F® is a poly-n-butyl acrylate. According to its specification this additive is solvent-free and has a nonvolatiles content of less than 1.5% at 30 min/140° C. It is a soft, viscous, tacky resin which is difficult to hydrolyse and has excellent light and ageing stability. Used alone, Acronal 4 F® produces a tacky film of low strength.

Byk-360 P® is an acrylate polymer applied to a specific silicic acid. The active substance is compounded at 60% to form a white, flowable powder. This levelling additive is equally effective in epoxy-, acrylate-, polyester- and polyurethane-based powder coatings. It is mixed with resin, hardener and pigments and then extruded with all of the components.

Occasionally, low molecular mass polyesters are also used. However, the results obtained accordingly do not meet the requirements made of the surface. Moreover, such surfaces possess in the unsanded state a degree of overcoatability which is often unsatisfactory.

The coating of car wheels made of steel or aluminium is a multicoat system. In such a system the powder coating is one constituent and may be employed in the systems as a priming powder coating, a metallic powder coating or a transparent powder coating. Depending on the specification or design, liquid coating material and powder coating material are combined in the system. In each of these cases, an extremely good bond between the individual coats is required, whether between the powder coats themselves or between powder coating and liquid coating material. The coat system comprising priming powder plus basecoat and clearcoat has proved particularly suitable.

At least equally high requirements are placed on the coating of a car body. In this case, powder coating material is likewise employed as primer or as topcoat. In the region of the bonnet in particular, a critical factor is particularly good, smooth levelling coupled with extremely good intercoat adhesion in the vulnerable stone chip zone.

SUMMARY OF THE INVENTION

The present invention set itself the object of providing powder coatings, and levelling agents for powder coatings, which are improved relative to the prior art in terms of the abovementioned requirements of bond properties and levelling, and with which there are no longer any wetting and adhesion defects, especially in the case of overcoating.

This object is achieved in accordance with the invention by a powder coating which is characterized in that it contains from 0.05 to 5% by weight, preferably from 0.5 to 1.5% by weight, of aliphatic polyvinyl ethers. The addition of the polyvinyl ether can be made during the actual preparation of the powder coating. Similarly, addition at a later point in time is also possible.

DETAILED DESCRIPTION OF THE INVENTION

Through the use of polyvinyl ethers it has surprisingly been possible to achieve a substantial improvement in the surface properties of powder coatings. A particularly surprising advantage is that the powder coating having its surface properties improved in this manner exhibits at the same time improved overcoatability with liquid systems. In the case of overcoating of this kind, there are no longer any wetting and adhesion defects.

Aliphatic polyvinyl ethers which can be employed are polymers comprising the basic structural unit

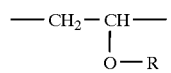

in which R is an aliphatic compound, i.e. an organic compound whose carbon atoms are arranged in straight or branched chains. R may in particular be an alkyl group, i.e. a saturated, branched or unbranched hydrocarbon compound of the formula $C_nH_{2n+1}$. In the case of the preferred compound polyvinyl ethyl ether, R is ethyl, i.e. the compound $C_2H_5$. In particular, the polyvinyl ethyl ether should be present as a homopolymer having a molar mass distribution of $M_n$=800–10,000, preferably 1000–5000, particularly preferably 1000–3000.

In addition to the novel polyvinyl ether additive, the powder coating may otherwise include all current types of powder coating, especially those based on epoxy resins, epoxy/polyester mixtures, polyesters, polyurethanes and/or acrylate resins.

Examples of known coating formulations are given in EP-509 392, EP-509 393, EP-322 827, EP-517 536, U.S. Pat. No. 5,055,524 and U.S. Pat. No. 4,849,283. The powder coating may in particular consist of epoxy resins, including epoxidized novolaks, of crosslinking agents, preferably phenolic or amine-type hardeners or bicyclic guanidines, catalysts, fillers and also, if desired, auxiliaries and additives.

The powder coatings employed in accordance with the invention may, for example, include epoxy resins, phenolic crosslinking agents, catalysts, assistants and, if desired, auxiliaries and powder-typical additives, such as flow aids.

Suitable epoxy resins are all solid epoxy resins having an epoxide equivalent weight of between 400 and 3000, preferably from 600 to 2000. These are principally epoxy resins based on bisphenol A and bisphenol F, or epoxidized novolak resins. They preferably have an epoxide equivalent weight of from 500 to 1000.

The epoxy resins based on bisphenol A and bisphenol F generally have a functionality of less than 2, while the epoxidized novolak resins have a functionality of more than 2. Particular preference in the novel powder coatings is given to epoxidized novolak resins having a mean functionality in the range from 2.4 to 2.8 and having an epoxide equivalent weight in the range from 600 to 850. In the case of the epoxidized novolak resins, the phenolic hydroxyl groups are etherified with alkyl, acrylic or similar groups. By reacting the phenolic hydroxyl groups with epichlorohydrins, epoxide groups are incorporated into the molecule. Starting from novolaks, the so-called epoxy novolak is formed in this case. The epoxidized novolaks are structurally related to bisphenol A resins. Epoxidized novolak resins can be prepared by epoxidation of novolaks which consists, for example, of from 3 to 4 phenol rings linked to one another by way of methylene bridges. As novolak resins, it is also possible to use alkyl-substituted phenols which are reacted with formaldehyde.

Examples of suitable epoxy resins are the products obtainable commercially under the following names: Epikote 1004, 1055, 3003, 3004, 2017 from Shell-Chemie, DEH 640, 671, 662, 663U, 664, 667 from Dow, and Araldit GT 6063, 6064, 6084, 6097, 7004, 7220, 7225 from Ciba Geigy.

For curing the epoxy resins, the novel powder coating includes phenolic or amine-type hardeners. Bicyclic guanidines may also be employed.

In this context it is possible, for example, to use any desired phenolic resin provided that it has the methylol functionality necessary for reactivity. Preferred phenolic resins are reaction products of phenol, substituted phenols and bisphenol A with formaldehyde which are prepared under alkaline conditions. Under such conditions, the methylol group is linked to the aromatic ring in either ortho or para position. In accordance with the present invention, particular preference is given to the use as phenolic crosslinking agents of hydroxyl-containing bisphenol A resins or bisphenol F resins having a hydroxy equivalent weight in the range from 180 to 600, particularly preferably in the range from 180 to 300. Phenolic crosslinking agents of this type are prepared by reacting bisphenol A or bisphenol F with glycidyl-containing components, for example the diglycidyl ether of bisphenol A. Phenolic crosslinking agents of this kind are obtainable, for example, under the trade name DEH 81, DEH 82 and DEH 87 from Dow, DX 171 from Shell-Chemie and XB 3082 from Ciba Geigy.

The epoxy resins and the phenolic crosslinking agents are employed in a proportion such that the ratio of the number of epoxide groups to the number of phenolic OH groups is approximately 1:1.

The novel powder coatings include one or more appropriate catalysts for epoxy resin curing. Appropriate catalysts are phosphonium salts of organic or inorganic acids, imidazole and imidazole derivatives, quaternary ammonium compounds, and amines. The catalysts are generally employed in proportions of from 0.001% by weight to about 10% by weight, based on the overall weight of the epoxy resin of the phenolic crosslinking agent.

Examples of appropriate phosphonium salt catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetate-acetic acid complex. These and further suitable phosphonium catalysts are described, for example, in U.S. Pat. No. 3,477,990 and U.S. Pat. No. 3,341,580.

Examples of appropriate imidazole catalysts are 2-styrylimidazole, 1-benzyl-2-methylimidazole, 2-methylimidazole and 2-butylimidazole. These and further imidazole catalysts are described, for example, in Belgian Patent No. 756,693.

In some cases, commercial phenolic crosslinking agents already include catalysts for epoxy resin crosslinking.

Examples of suitable epoxy-functional binders for transparent powder coatings are polyacrylate resins which contain epoxide groups and can be prepared by copolymerization of at least one ethylenically unsaturated monomer containing at least one epoxide group in the molecule with at least one further ethylenically unsaturated monomer containing no epoxide group in the molecule, at least one of the monomers being an ester of acrylic acid or methacrylic acid.

Polyacrylate resins which contain epoxide groups are known (cf. e.g. EP-A-299 420, DE-B-22 14 650, DE-B-27 49 576, U.S. Pat. No. 4,091,048 and U.S. Pat. No. 3,781,379).

Examples of the ethylenically unsaturated monomers containing at least one epoxide group in the molecule are glycidyl acrylate, glycidyl methacrylate and allyl glycidyl ether.

Examples of ethylenically unsaturated monomers containing no epoxide group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers containing no epoxide groups in the molecule are acids, for example acrylic acid and methacrylic acid, acid amides, for example acrylamide and methacrylamide, vinyl-aromatic compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, for example vinyl acetate, and hydroxyl-containing monomers, for example hydroxyethyl acrylate and hydroxyethyl methacrylate.

The polyacrylate resin which contains epoxide groups normally has an epoxide equivalent weight of from 400 to 2500, preferably from 500 to 1500, particularly preferably from 600 to 1200, a number-average molecular weight (determined by gel permeation chromatography using a polystyrene standard) of from 1000 to 15,000, preferably from 1200 to 7000, particularly preferably from 1500 to 5000 and a glass transition temperature (TG) of from 30 to 80° C., preferably from 40 to 70° C., particularly preferably from 50 to 70° C. (measured with the aid of differential scanning calorimetry (DSC)).

The polyacrylate resin which contains epoxide groups can be prepared by generally well-known methods by means of free-radical polymerization.

Examples of suitable hardeners for the epoxide-group-containing polyacrylate resin are polyanhydrides of polycarboxylic acids or of mixtures of polycarboxylic acids, especially polyanhydrides of dicarboxylic acids or of mixtures of dicarbolic acids.

Polyanhydrides of this kind can be prepared by removing water from the polycarboxylic acid or mixture of polycarboxylic acids, with two carboxyl groups in each case reacting to form one anhydride group. Such preparation techniques are well known and therefore require no more detailed description.

The powder coatings employed in accordance with the invention may also, for example, include epoxy/polyester mixtures as binder base. Powder coatings of this kind may for example comprise A) at least one polyester having an acid number of from 25 to 120 mg of KOH/g and B) at least one epoxy resin having an epoxide equivalent weight of 400–3000.

Suitable polyester types A) are commercially available in the trade. Examples of them are: Crylcoat 314, 316, 340, 360 from UCB, and Uralac P2450, P2980, P3560 from DSM.

Examples of suitable epoxy resins are the products commercially available under the following names: Epikote 1055, 1004, 1007, 3003, 3003-FCA-10 from Shell-Chemie, DER 662 UE, 664, 642, 672 from Dow-Chemie and Araldit GT 6061, GT 6064, GT 7072, GT 7004 from Ciba-Geigy.

The powder coatings employed in accordance with the invention may also include mixtures of COOH-functionalized polyesters and suitable crosslinking agents. Examples of suitable crosslinking agents are the following commercially available products: Araldit PT 810, PT 910 from Ciba-Geigy and Primid XL 552 from Ems-Chemie.

COOH-functionalized polyesters which are suitable for the abovementioned crosslinking agents can be obtained commercially, for example, under the following designations: Uralac P 2200, P 3485, P 3400, P 5000, P 6000, P 6600 from DSM or Crylcoat 800, 802, 803, 810, 491, 430, 440, 490, 620 from UCB.

The powder coatings employed in accordance with the invention may also include mixtures of OH-functionalized polyesters or polyacrylate binders and appropriate hardeners based on polyisocyanates.

Examples of suitable polyisocyanate hardeners are the following commercially available products: Vestagon BF 1300, BF 1540, B 1065 from Hüls. Examples of suitable OH-functionalized polyesters are the following commercially available products: Uralac P 1480, P 2115, P 2504, P 5504, P 1550 from DSM and Crylcoat 240, 290, 291, 2383, 690 from UCB.

An example of a commercially available OH-functionalized polyacrylate binder is Joncryl 587 from SC Johnson.

The powder coatings contain from 50 to 90%, preferably from 60 to 80% by weight of binder and from 10 to 50% by weight, preferably from 20 to 40% by weight of fillers.

Examples of suitable fillers are glycidyl-functionalized crystalline silicic acid modifications. They are usually employed in the stated range of from 10 to 50% by weight, based on the overall weight of the powder coating material. In some cases, however, proportions of filler of more than 50% by weight are also possible.

The crystalline silicic acid modifications include quartz, cristobalite, tridymite, keatite, stishovite, melanophlogite, coesite and fibrous silicic acid. The crystalline silicic acid modifications are glycidyl-functionalized, glycidyl functionalization being achieved by a surface treatment. The silicic acid modifications involved are, for example, those based on quartz, cristobalite and fused quartz, which are prepared by treating the crystalline silicic acid modifications with epoxysilanes. The glycidyl-functionalized silicic acid modifications are available commercially, for example under the designation Silbond® 600 EST and Silbond® 6000 EST (manufacturer: Quarzwerke GmbH) and are prepared by reacting crystalline silicic acid modifications with epoxysilanes.

The powder coating materials may additionally comprise further inorganic fillers, for example titanium oxide, barium sulphate and silicate-based fillers, such as talc, kaolin, magnesium-silicates, aluminium silicates, mica and the like. The powder coatings may, furthermore and if desired, also include auxiliaries and additives. Examples of these are levelling agents, flow aids and degassing agents, for example benzoin.

The powder coatings are prepared by known methods (cf. e.g. the product information bulletin "Pulverlacke" [powder coatings] from BASF Lacke+Farben AG, 1990) by homogenizing and dispersing, for example by means of an extruder, screw compounder and the like. After the powder coatings have been prepared, they are adjusted by grinding and, if desired, by classifying and sieving to the desired particle-size distribution.

The present invention also relates to a process for the preparation of powder coatings, which is characterized in that from 0.05 to 5% by weight, preferably from 0.5 to 1.5% by weight, of aliphatic polyvinyl ethers are added to the powder coatings.

In accordance with the invention it is possible to add the polyvinyl ether to the powder coatings at any desired point in time; in other words, the polyvinyl ether can be added either during the preparation of the powder coating or else not until directly before the latter is used. A powder coating prepared by the novel process exhibits surprising improvements in respect of surface quality and surface smoothness and in respect of the adhesion properties for a subsequent coat.

In the novel process, the polyvinyl ether employed is preferably a polyvinyl ethyl ether, very preferably in the form of a homopolymer having a molar mass distribution of $M_n$=800–10,000, preferably 1000–5000, particularly preferably 1000–3000.

The novel process can be employed for all current types of powder coating, especially with those based on epoxy resins, epoxy/polyester mixtures, polyesters, polyurethanes and/or acrylate resins.

The invention additionally relates to an additive for improving the surface properties of powder coatings, which is characterized in that it comprises aliphatic polyvinyl ethers, preferably polyvinyl ethyl ether.

Finally, the invention also relates to the use of the additive for improving the surface properties of powder coatings.

The additive can be added to the powder coating at different stages in a powder coating operation. This can be done during the preparation of the powder coating, or else not until directly before the coating is applied. In this way it is left to the user to control the levelling properties of his powder coating by means of appropriate dosing of the additive.

In addition to the polyvinyl ether, the novel additive may include customary degassing agents, matting additives, waxes for influencing the surface hardness, structural and textural additives, and also catalysts and flow aids.

What is claimed is:

1. A powder coating having improved surface properties, comprising from 0.05 to 5% by weight of a levelling agent consisting of aliphatic polyvinyl ethers of the formula

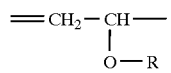

wherein R is an aliphatic compound of the formula ($C_nH_{2n+1}$).

2. The powder coating according to claim 1, wherein the polyvinyl ether comprises a polyvinyl ethyl ether having a molecular mass distribution $M_n$=800–10,000.

3. The powder coating according to claim 1, wherein the polyvinyl ether comprises a polyvinyl ethyl ether homopolymer having a molecular mass distribution $M_n$=1000–3000.

4. The powder coating of claim 1, comprising a powder coating comprising a resin selected from the group consisting of epoxy resins, epoxy/polyester mixtures, polyesters, polyurethanes, acrylate resins and mixtures thereof.

5. A process for the preparation of powder coatings, comprising adding to a powder coating from 0.05 to 5% by weight of a levelling agent consisting of aliphatic polyvinyl ethers of the formula

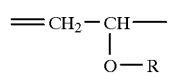

wherein R is an aliphatic compound of the formula ($C_nH_{2n+1}$).

6. The process of claim 5, wherein the polyvinyl ether comprises a polyvinyl ethyl ether having a molecular mass distribution $M_n$=800–10,000.

7. The process of claim 5, wherein the polyvinyl ether comprises a polyvinyl ethyl ether homopolymer having a molecular mass distribution of $M_n$=1000–3000.

8. The process claim 5, comprising a powder coating comprising a resin selected from the group consisting of epoxy resins, epoxy/polyester mixtures, polyesters, polyurethane, acrylate resins is employed and mixtures thereof.

9. An additive for improving the surface properties of powder coatings, consisting of aliphatic polyvinyl ethers of the formula

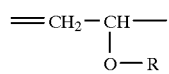

wherein R is an aliphatic compound of the formula ($C_nH_{2n+1}$).

10. A method of improving the surface properties of a powder coating, comprising adding an additive to a powder coating, wherein the additive comprises an aliphatic polyvinyl ether.

11. The powder coating of claim 1, comprising from 0.5 to 1.5% by weight, of aliphatic polyvinyl ethers.

12. The powder coating according to claim 2, wherein the polyvinyl ether comprises a polyvinyl ethyl ether a homopolymer having a molecular mass distribution $M_n$=1000–5000.

13. The process of claim 5, wherein the polyvinyl ether comprises a polyvinyl ethyl ether homopolymer having a molecular mass distribution $M_n$=1000–5000.

14. An additive for improving the surface properties of powder coatings, comprising polyvinyl ethyl ether.

* * * * *